United States Patent [19]

Androy

[11] Patent Number: 4,940,283
[45] Date of Patent: Jul. 10, 1990

[54] T-TOP ROOFING SYSTEM

[76] Inventor: Gilbert G. Androy, 510 Marion Ave., Malvern, Iowa 51551

[21] Appl. No.: 386,775

[22] Filed: Jul. 31, 1989

[51] Int. Cl.⁵ .............................................. B60J 7/19
[52] U.S. Cl. ................................... 296/216; 296/218; 296/223
[58] Field of Search ................. 296/216, 218, 220, 223

[56] References Cited

U.S. PATENT DOCUMENTS

| | | | |
|---|---|---|---|
| 4,081,926 | 4/1978 | Jardin | 49/210 |
| 4,438,972 | 3/1984 | Katayama et al. | 296/223 |
| 4,468,063 | 8/1984 | Yukimoto et al. | 296/223 |
| 4,475,766 | 10/1984 | McKee | 296/218 |
| 4,600,237 | 7/1986 | Huber et al. | 296/223 |
| 4,616,456 | 10/1986 | Parker | 296/216 |
| 4,671,565 | 6/1987 | Grimm et al. | 296/216 |
| 4,729,596 | 3/1988 | Fujihara et al. | 296/218 |

FOREIGN PATENT DOCUMENTS 287626 11/1988 Japan ................................... 296/220

Primary Examiner—Robert R. Song
Attorney, Agent, or Firm—Zarley, McKee, Thomte, Voorhees & Sease

[57] ABSTRACT

A T-top roofing system is formed in a motor vehicle with first and second openings formed in the vehicle roof above the driver's and forward passenger's seats. A T-bar separates the openings and extends rearwardly to a rearward portion of the roof. Each roof opening has an individual roof panel which is slidably mounted so as to move between a closed position fully enclosing the roof opening, and a retracted position moved rearwardly into a hollow cavity within the rearward portion of the roof. Each roof panel is operably connected to a rotatable threaded rod mounted adjacent the T-bar, the rod being selectively rotatable in one direction or the other so as to slide the roof panel forwardly or rearwardly. Independent switches are connected to electric motors which are in turn connected to the threaded rods, such that each of the roof panels may be independently operated from within the vehicle. A spacer element extends from the forward frame on the windshield, over each door opening, and then to the rearward roof portion. Each spacer element has a track along one edge which will slidably receive a roof panel so as to guide the panel along the outer edge of the roof. Each spacer element includes retractable pins which will allow the spacer elements to be removed from between the forward frame and rearward roof frame.

8 Claims, 3 Drawing Sheets

T-TOP ROOFING SYSTEM

TECHNICAL FIELD

This invention relates generally to an improved T-top roofing system for use with automobiles, and more specifically to a T-top roofing system having retractable roof panels and removable side elements.

BACKGROUND OF THE INVENTION

T-top type roofing systems are found primarily on sporty models of automobiles, and are designed to permit the driver and/or front seat passenger to remove a portion of the roof positioned above the head for exposure to the elements, and enhance the pleasure of driving. However, there are a number of drawbacks associated with this type of roofing system.

The primary drawback of current T-top roofing systems is that the roof panels must be manually removed from the roofing system and then stored elsewhere in the vehicle. This consumes valuable cargo space — which is usually very limited in many of the sporty models of automobiles — and requires the user to exit the vehicle to remove the panels.

Another problem with present T-top roofing systems is that there is no method for selectively controlling the amount of exposure to the outside environment. The T-top roof panels are either fully installed or fully removed. The ability to control the exposure to outside elements is one reason why sunroofs and the like have become so popular with the automobiles of today.

It is therefore a principal object of the present invention to provide an improved T-top roofing system.

A further object of the present invention is to provide a T-top roofing system which utilizes a pair of roof panels which are retractable into the roof.

Another object is to provide T-top roofing system with roof panels which are independently and selectively retractable.

Still a further object of the present invention is to provide a T-top roofing system which permits removal of a portion of the roof from the T-bar to the door window.

Another object of the present invention is to provide a T-top roofing system which provides the benefits of both conventional T-top roofs and sunroofs.

These and other objects will be apparent to those of ordinary skill in the art.

SUMMARY OF THE INVENTION

The T-top roofing system of the present invention is formed in a motor vehicle having at least a driver's seat and forward passenger's seat. First and second openings are formed in the vehicle roof above each of the driver's and forward passenger's seats and extend rearwardly from the forward frame member which retains the windshield of the vehicle. A T-bar separates the openings and extends rearwardly to a rearward portion of the roof. Each roof opening has an individual roof panel which is slidably mounted so as to move between a closed position fully enclosing the roof opening, and a retracted position moved rearwardly into a hollow cavity within the rearward portion of the roof. Each roof panel is operably connected to a rotatable threaded rod mounted adjacent the T-bar, the rod being selectively rotatable in one direction or the other so as to slide the roof panel forwardly or rearwardly. Independent switches are connected to electric motors which are in turn connected to the threaded rods, such that each of the roof panels may be independently operated from within the vehicle.

A spacer element extends from the forward frame on the windshield, over each door opening, and then to the rearward roof portion. Each spacer element has a track along one edge which will slidably receive a roof panel so as to guide the panel along the outer edge of the roof. Each spacer element also has a slot in the edge opposing the roof panel track, which will receive the upper edge of the door window for a tight fit. Each spacer element includes retractable pins which will allow the spacer elements to be removed from between the forward frame and rearward roof frame. Removal of the spacer elements allows the user to open a space extending from each door to the T-bar.

DESCRIPTION OF THE PREFERRED EMBODIMENT

Figure 1:
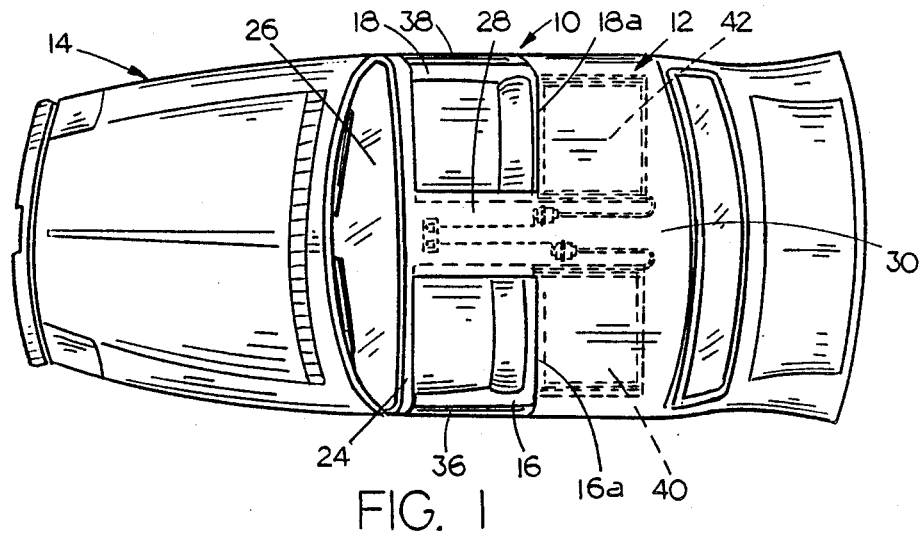
FIG. 1 is a top view of an automobile showing the T-top roofing system of the present invention with the roof panels in a retracted position.

Referring now to the drawings, in which identical or corresponding parts are identified by the same reference numeral, the T-top roofing system of the present invention is identified generally at 10 and is mounted on the roof 12 of an automobile 14.

First and second spaced apart rectangular openings 16 and 18 are formed in roof 12, opening 16 being located above the driver's seat 20 and opening 18 being located above the front passenger's seat 22. A frame member 24 along the forward edge of the roof holds windshield 26 in position and forms the head of the "T" of roofing system 10. A narrow, centrally located, longitudinal strip of roof, known as the T-bar 28, separates openings 16 and 18 and extends from frame member 24 rearwardly to the rear portion 30 of roof 12. Rearward roof portion 30 covers the rear passenger seats of automobile 14, and forms the rearward edge of openings 16 and 18. Each opening 16 and 18 extends from T-bar 28 to door windows 32 and 34, respectively, so that lowering of windows 32 and 34 provides a completely open space from the vehicle doors 36 and 38 to the T-bar 28.

Rear roof portion 30 has a pair of hollow cavities 40 and 42 extending from the rearward edges 16a and 18a of openings 16 and 18, each of which will receive a retractable roof panel 44 and 46 respectively. Roof panels 44 and 46 preferably have a glass portion 48 therein to allow sunlight to pass therethrough. Because roof panel 46 is a mirror image of roof panel 44, only roof panel 44 will be described in detail herein. Roof panel 44 has a forward rail 50 which projects forwardly therefrom and is selectively received within a forward channel 52 in frame member 24 for a tight sealable fit. A side rail 54 projects from the outer edge of panel 44 and is received within an outer channel 56 along the edge of a spacer element 58, described in more detail hereinbelow. A pair of guide brackets 60 project outwardly from the inner edge of panel 44, and are located adjacent the forward and rearward edges of the roof panel. Each guide bracket 60 has an interiorly threaded bore extending longitudinally therethrough which corresponds with a threaded rod 64 mounted in a channel 66 along T-bar 28. Each guide bracket 60 is threaded onto threaded rod 64 so as to slide along channel 66 upon rotation of the threaded rod, thereby moving roof panel 44 forwardly or rearwardly.

Channel 66 extends rearwardly along T-bar 28 into hollow cavity 42 and to the rearward extent thereof. Threaded rod 64 is rotatably mounted within channel 66, and extends from end to end, so as to drive roof panel 44 between a closed position in opening 18 and a retracted position within hollow cavity 42. The rearward end 64a of threaded rod 64 is connected to a drive cable 68 via a connector 70. Drive cable 68 is journaled through a flexible conduit 72 and extends to the drive shaft 74 of a reversible electric motor 76. Drive cable 68 is flexible so as to be rotatable within flexible conduit 72 through bends and the like. Operation of electric motor 76 will rotate drive cable 68 within conduit 72 so as to rotate threaded rod 64. A second electric motor 78 is connected in a similar fashion to the threaded rod 64 of roof panel 46.

A pair of double throw electrical switches 80 and 82 are electrically connected to electric motors 76 and 78 respectively, and will cause the electric motors to be driven in one direction or the other. In this fashion, each roof panel 44 and 46 may be independently and selectively retracted or closed.

Figure 2:
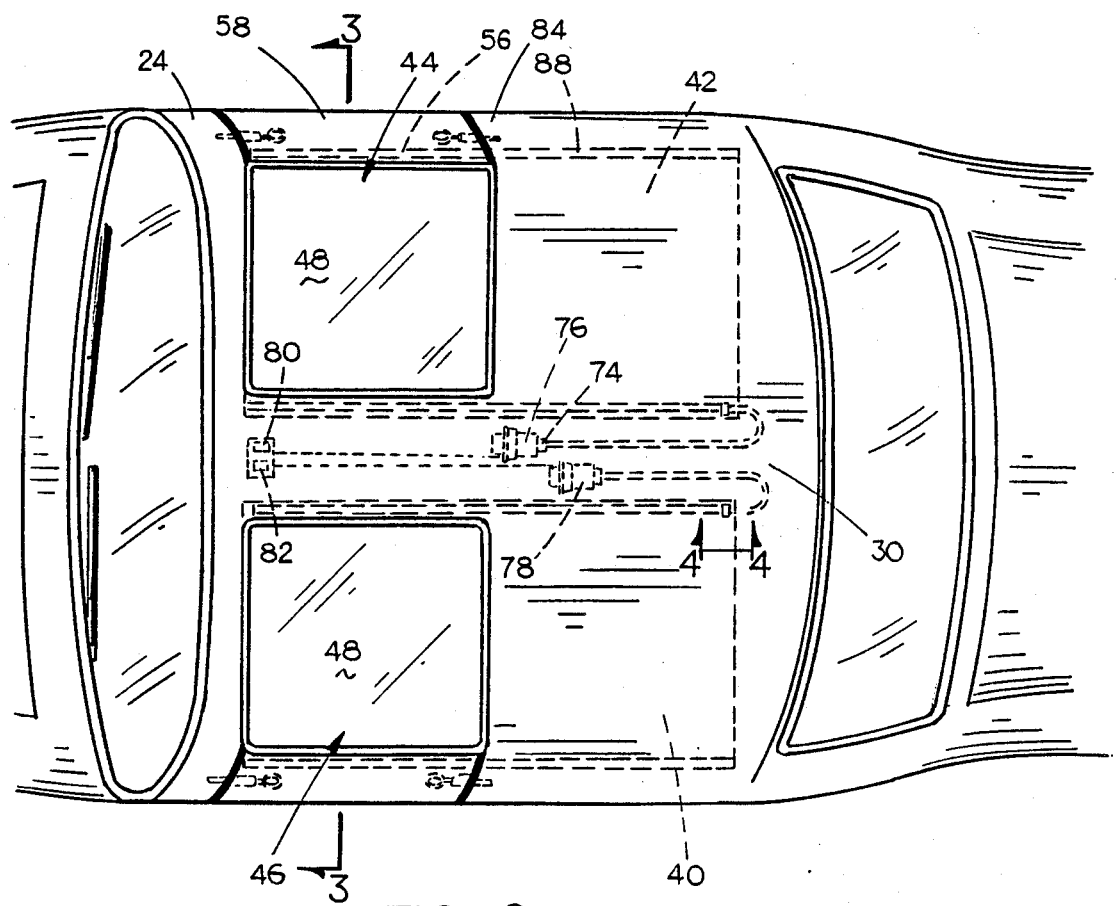
FIG. 2 is an enlarged view of FIG. 1 with the roof panels in a closed position.
Figure 3:
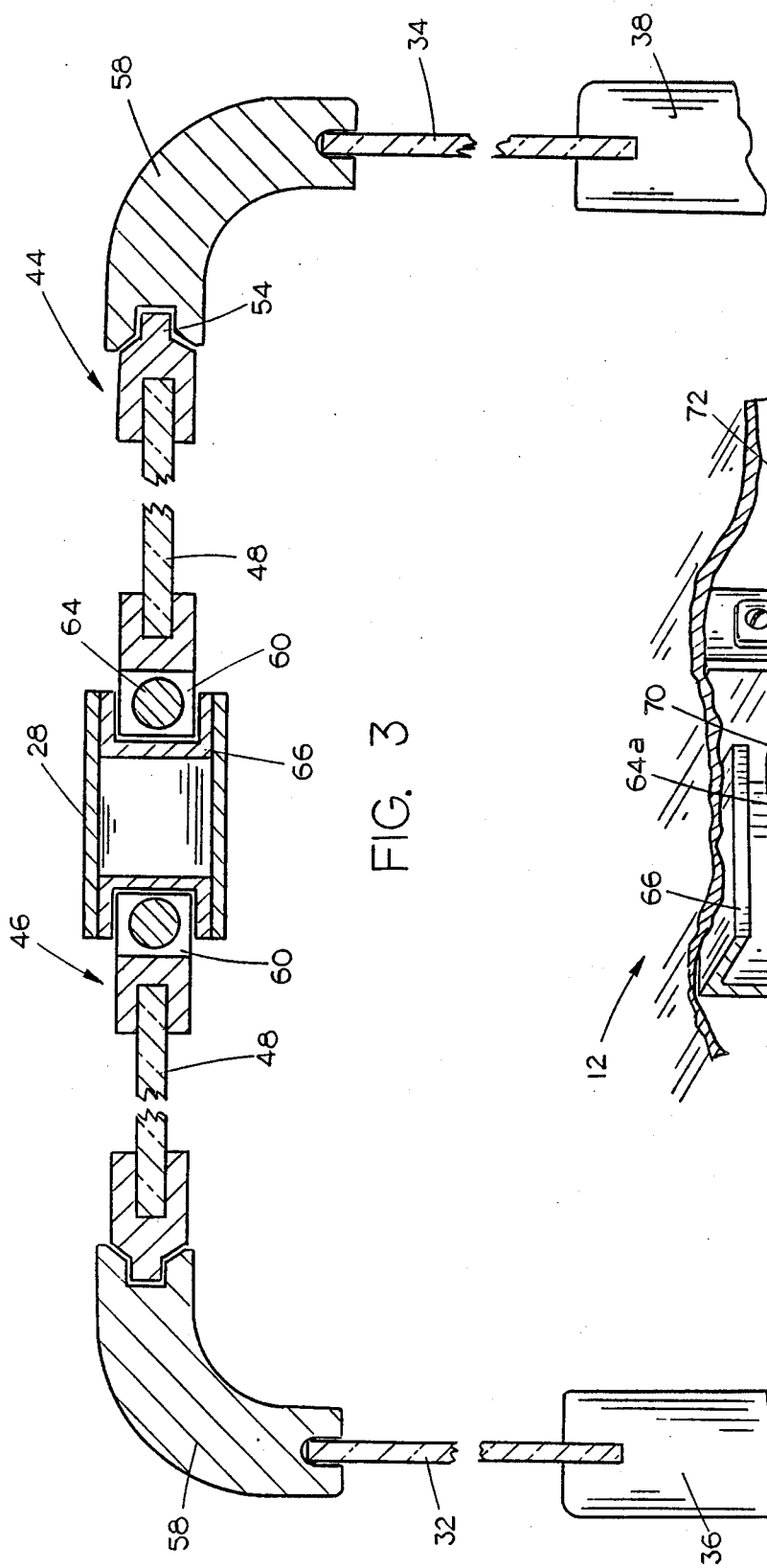
FIG. 3 is a cross-sectional view taken at lines 3—3 in FIG. 2.
Figure 4:
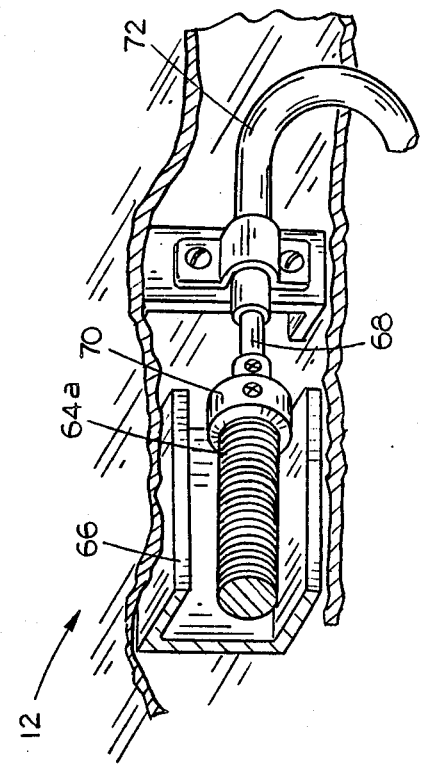
FIG. 4 is an enlarged perspective and sectional view taken at lines 4—4 in FIG. 2.

Spacer element 58 is removably mounted between frame member 24 and rearward roof portion 30 over the door windows 34, to support roof panels 44 and 46. A slot 86 along the lower longitudinal edge of spacer 58 will receive window 34 therein so as to seal the interior of the car from the elements when the window is rolled up. Outer channel 56 is aligned with an auxiliary channel 88 (see FIG. 2) formed within the hollow cavity 42, such that side rail 54 will slide continuously from auxiliary channel 88 into outer channel 56 when roof panel 44 is operated.

Figure 5:
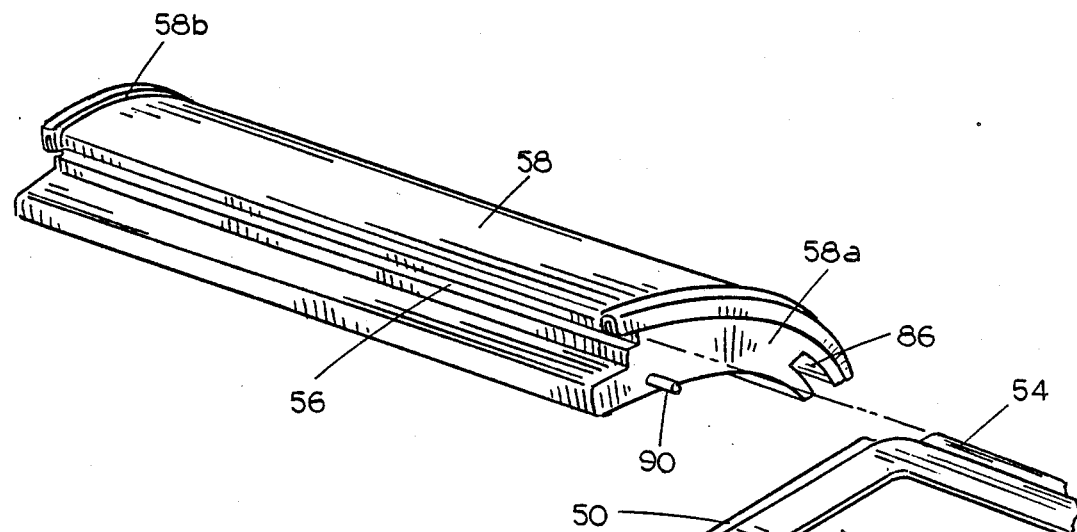
FIG. 5 is an enlarged exploded view of the spacer element of the present invention.
Figure 6:
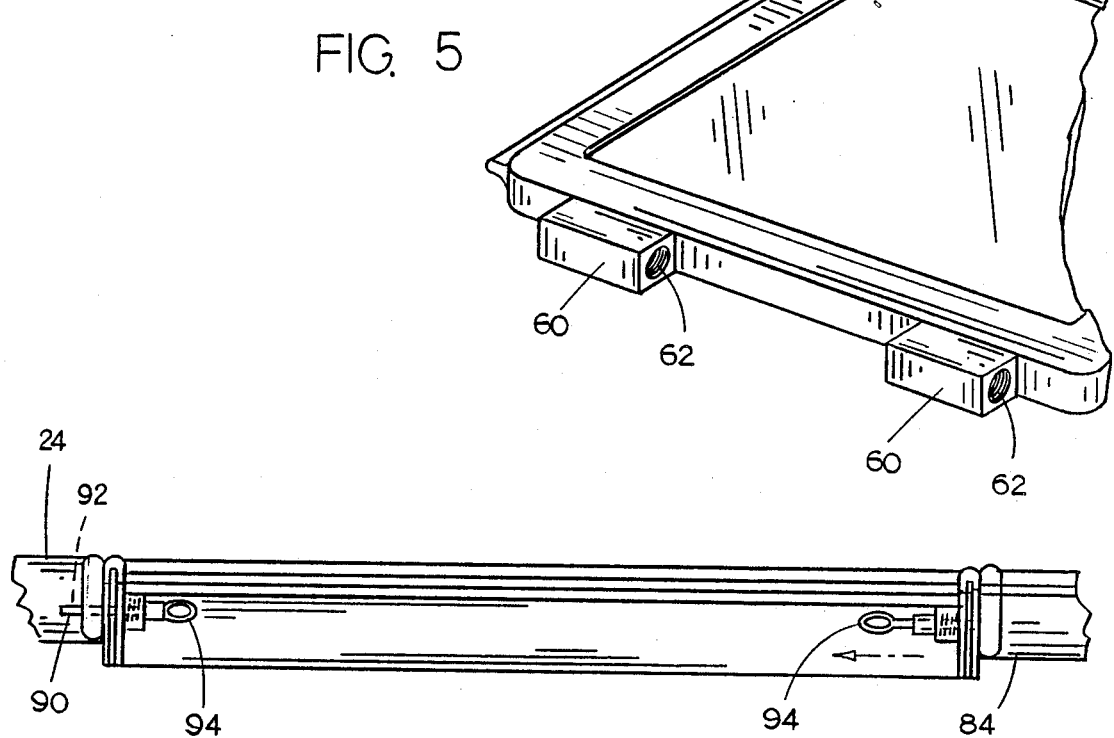
FIG. 6 is a side elevational view of the spacer element secured in position.

As shown in FIGS. 5 and 6, each transverse end 58a and 58b of spacer 58 has a retractable pin 90 projecting therefrom corresponding with an aperture 92 in the adjacent frame member 24 and the forward edge of rearward roof portion 30, so as to lock spacer 58 in position between frame member 24 and forward edge 84 of rearward roof portion 30. Each pin 90 has a ring 94 mounted on one end, and is spring loaded, such that pin 90 is urged outwardly into journaled locked relation in apertures 92.

Whereas the invention has been shown and described in connection with the preferred embodiment thereof, it will be understood that many modifications, substitutions and additions may be made which are within the intended broad scope of the appended claims. Therefore, there has been shown and described an improved T-top roofing system which accomplishes at least all of the above stated objects.

I claim:

1. A T-top roofing system, comprising:
   a motor vehicle having a roof spaced above a passenger compartment;
   said motor vehicle having at least a driver's seat and a forward passenger's seat, a windshield, and a forward frame member surrounding and securing said windshield to said motor vehicle;
   said roof having first and second openings formed therein, the first opening located generally above the driver's seat and the second opening located generally above the forward passenger's seat;
   said roof having a T-bar portion extending from a rearward portion of said roof, between said openings, and forwardly to said forward frame member;
   said rearward portion of said roof having first and second hollow cavities formed therein adjacent to said first and second openings, and opening into said first and second openings; and
   first and second roof panels independently slidably mounted in said roof for selective, adjustable movement between closed positions, wherein said roof panels completely fill said first and second openings, and retracted positions, wherein said panels are retracted within said first and second hollow cavities.

2. The T-top roofing system of claim 1, further comprising:
   a first spacer element extending from said forward frame to said rearward roof portion, parallel to said T-bar portion, and forming an exterior edge of said first opening;
   a second spacer element extending from said forward frame to said rearward roof portion, parallel to said T-bar portion, and forming an exterior edge of said second opening;
   each said spacer element having a first guide means along the exterior edge of said first and second openings and extending from the forward frame to the rearward roof portion, for guiding the movement of one edge of said roof panels;
   means for removably mounting said spacer elements between said forward frame and rearward roof portions for selective removal of said spacer elements; and
   said T-bar portion having a second guide means mounted along each edge adjacent said first and second openings, and extending from the forward frame to the rearward roof portion, for the guiding the movement of an edge of said roof panels.

3. The T-top roofing system of claim 2, wherein said means for selectively mounting each said spacer element includes a first retractable pin means projecting from the forward end of said first and second spacer elements and a second retractable pin means projecting from the rearward edge of each said spacer elements, said forward frame and said rearward roof portion having apertures therein located to receive said first and second pin means of said first and second spacer elements.

4. The T-top roofing system of claim 3, further comprising means for retracting said first and second pin means in each said first and second spacer elements, connected between said first and second pin means and operable to simultaneously retract said first and second pin means.

5. The T-top roofing system of claim 1, wherein said roof panels have a window portion formed therein.

6. The T-top roofing system of claim 1, further comprising operable means for selectively sliding said roof panels.

7. The T-top roofing system of claim 6, wherein said operable means for sliding said roof panels includes first and second reversible motor means mounted in said roof, said first motor means being operably connected to said first roof panel and said second motor means being operably connected to said second panel, said first and second motor means selectively operable to slide said first and second panels forwardly or rearwardly.

8. The T-top roofing system of claim 7, wherein said motor means are electrically operated, and further comprising first and second operable switches mounted within said passenger compartment and electrically connected between said motor means and a source of electrical power, said first switch connected so as to independently operate said first motor means in a forward or reverse direction, and said second switch connected so as to independently operate said second motor means in a forward or reverse direction.

* * * * *